US009621672B2

(12) United States Patent
Kadashevich et al.

(10) Patent No.: US 9,621,672 B2
(45) Date of Patent: Apr. 11, 2017

(54) ESTABLISHING SOCIAL NETWORK CONNECTIONS

(71) Applicant: International Business Machines Corporation, Armonk, NY (US)

(72) Inventors: A. Julie Kadashevich, Tyngsboro, MA (US); Jane B. Marcus, Medford, MA (US); Jessica L. Piziak, Ayer, MA (US); Purvi K. Trivedi, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 787 days.

(21) Appl. No.: 13/894,818

(22) Filed: May 15, 2013

(65) Prior Publication Data
US 2014/0344370 A1 Nov. 20, 2014

(51) Int. Cl.
*H04L 29/08* (2006.01)
*G06Q 10/06* (2012.01)
*G06Q 10/10* (2012.01)
*G06Q 30/02* (2012.01)
*G06Q 50/00* (2012.01)

(52) U.S. Cl.
CPC ........... *H04L 67/306* (2013.01); *G06Q 10/06* (2013.01); *G06Q 10/10* (2013.01); *G06Q 30/02* (2013.01); *G06Q 50/01* (2013.01)

(58) Field of Classification Search
CPC ...... H04L 67/306; G06Q 50/00; G06Q 50/01; G06Q 10/00; G06Q 10/06; G06Q 10/10; G06Q 30/00; G06Q 30/02
See application file for complete search history.

(56) References Cited

U.S. PATENT DOCUMENTS

| 7,120,455 B1 * | 10/2006 | Chen ..................... H04L 12/581 455/414.1 |
| 7,680,770 B1 | 3/2010 | Buyukkokten et al. |
| 8,078,682 B1 * | 12/2011 | Worley .................. G06Q 30/02 709/206 |
| 8,135,800 B1 * | 3/2012 | Walsh et al. .................. 709/217 |
| 8,145,257 B2 * | 3/2012 | Yim ....................... H04L 12/581 455/414.1 |
| 8,364,711 B2 * | 1/2013 | Wilkins ................. G06Q 10/10 707/783 |

(Continued)

*Primary Examiner* — Thu Nguyen
*Assistant Examiner* — Angela Widhalm De Rodrig
(74) *Attorney, Agent, or Firm* — Cuenot, Forsythe & Kim, LLC

(57) ABSTRACT

A request to add at least a second user of a social network as a contact of a first user in the social network can be received. A social hierarchy indicating a hierarchical relationship between the first user and the second user can be accessed. Based on the hierarchical relationship between the first user and the second user, whether the second user must approve the request in order for the at least second user to be added as the contact of the first user in the social network can be determined. Responsive to determining that it is not required that the at least second user must approve the request in order for the at least second user to be added as the contact of the first user in the social network, the second user can be added as the contact of the first user in the social network without prompting the second user to approve the request.

17 Claims, 4 Drawing Sheets

(56) References Cited

U.S. PATENT DOCUMENTS

| | | | |
|---|---|---|---|
| 8,984,005 B2* | 3/2015 | Gropper | G06Q 30/02 707/770 |
| 9,117,196 B2* | 8/2015 | Silas | G06Q 10/10 |
| 2003/0050977 A1 | 3/2003 | Puthenkulam et al. | |
| 2005/0080859 A1* | 4/2005 | Lake | 709/206 |
| 2008/0104679 A1* | 5/2008 | Craig | H04L 67/306 726/4 |
| 2009/0043843 A1* | 2/2009 | Milewski et al. | 709/204 |
| 2009/0144627 A1 | 6/2009 | O'Sullivan et al. | |
| 2009/0327484 A1 | 12/2009 | Chen et al. | |
| 2010/0015975 A1* | 1/2010 | Issa | H04L 63/102 455/435.1 |
| 2010/0036912 A1 | 2/2010 | Rao | |
| 2010/0161369 A1 | 6/2010 | Farrell et al. | |
| 2010/0205276 A1* | 8/2010 | Quintarelli | 709/217 |
| 2010/0299363 A1 | 11/2010 | Bhattacharjee et al. | |
| 2010/0332584 A1* | 12/2010 | Koul et al. | 709/203 |
| 2011/0047182 A1 | 2/2011 | Shepherd et al. | |
| 2011/0213806 A1* | 9/2011 | Zuber | 707/784 |
| 2011/0271197 A1 | 11/2011 | Jones et al. | |
| 2011/0276628 A1* | 11/2011 | Pell | G06Q 10/10 709/204 |
| 2012/0089919 A1 | 4/2012 | Kennedy et al. | |
| 2012/0209926 A1 | 8/2012 | Backholm et al. | |

* cited by examiner

400

```
Receive a request to add at least a second user of the social
network as a contact of a first user in a social network
405
                          │
                          ▼
Access at least one social hierarchy indicating a hierarchical
relationship between the first user and the at least second user
410
                          │
                          ▼
Based on the hierarchical relationship between the first user and
the at least second user, via a processor, determine whether the at
least second user must approve the request in order for the at least
second user to be added as the contact of the first user in the social
network
415
                          │
                          ▼
                  Second user                    Yes
              must approve request?  ─────────────┐
                       420                        │
                          │ No                    │
                          ▼                       │
Add the at least second user as the contact of the first user in the
social network without prompting the at least second user to
approve the request
425                                               │
                          │                       │
                          ▼                       │
Prompt the second user to approve the request ◄───┘
430
```

FIG. 4

ESTABLISHING SOCIAL NETWORK CONNECTIONS

BACKGROUND

The present arrangements relate to social networks and, more particularly, establishing social network connections.

As use of the Internet and other networking services continue to proliferate, so too does the use of social network services. Social network services provide a convenient way for people to stay in touch with one another and keep abreast of current events. A social network service typically provides a representation of each user (e.g., a profile), his/her social links, and a variety of additional services. Most social network services are web-based and provide means for users to interact over the Internet. For example, social networking sites allow users to share ideas, pictures, posts, activities, events, and interests with people (i.e., contacts) in their network. In contrast to online community services, such as forums, a social network service usually is an individual-centered service whereas online community services are group-centered.

BRIEF SUMMARY

One or more embodiments disclosed within this specification relate establishing social network connections.

An embodiment can include a method of establishing social network connections. The method can include receiving a request to add at least a second user of a social network as a contact of a first user in the social network. The method also can include accessing at least one social hierarchy indicating a hierarchical relationship between the first user and the at least second user and, based on the hierarchical relationship between the first user and the at least second user, via a processor, determining whether the at least second user must approve the request in order for the at least second user to be added as the contact of the first user in the social network. The method further can include, responsive to determining that it is not required that the at least second user must approve the request in order for the at least second user to be added as the contact of the first user in the social network, adding the at least second user as the contact of the first user in the social network without prompting the at least second user to approve the request.

Another embodiment can include a system having a processor. The processor can be configured to initiate executable operations including receiving a request to add at least a second user of a social network as a contact of a first user in the social network. The executable operations also can include accessing at least one social hierarchy indicating a hierarchical relationship between the first user and the at least second user and, based on the hierarchical relationship between the first user and the at least second user, determining whether the at least second user must approve the request in order for the at least second user to be added as the contact of the first user in the social network. The executable operations further can include, responsive to determining that it is not required that the at least second user must approve the request in order for the at least second user to be added as the contact of the first user in the social network, adding the at least second user as the contact of the first user in the social network without prompting the at least second user to approve the request.

Another embodiment can include a computer program product for establishing social network connections. The computer program product can include a computer-readable storage medium having stored thereon program code that, when executed, configures a processor to perform a method. The method can include receiving a request to add at least a second user of a social network as a contact of a first user in the social network. The method also can include accessing at least one social hierarchy indicating a hierarchical relationship between the first user and the at least second user and, based on the hierarchical relationship between the first user and the at least second user, via a processor, determining whether the at least second user must approve the request in order for the at least second user to be added as the contact of the first user in the social network. The method further can include, responsive to determining that it is not required that the at least second user must approve the request in order for the at least second user to be added as the contact of the first user in the social network, adding the at least second user as the contact of the first user in the social network without prompting the at least second user to approve the request.

BRIEF DESCRIPTION OF THE SEVERAL VIEWS OF THE DRAWINGS

FIG. 4 is a flow chart illustrating a method of establishing social network connections in accordance with one embodiment disclosed within this specification.

DETAILED DESCRIPTION

Figure 1:
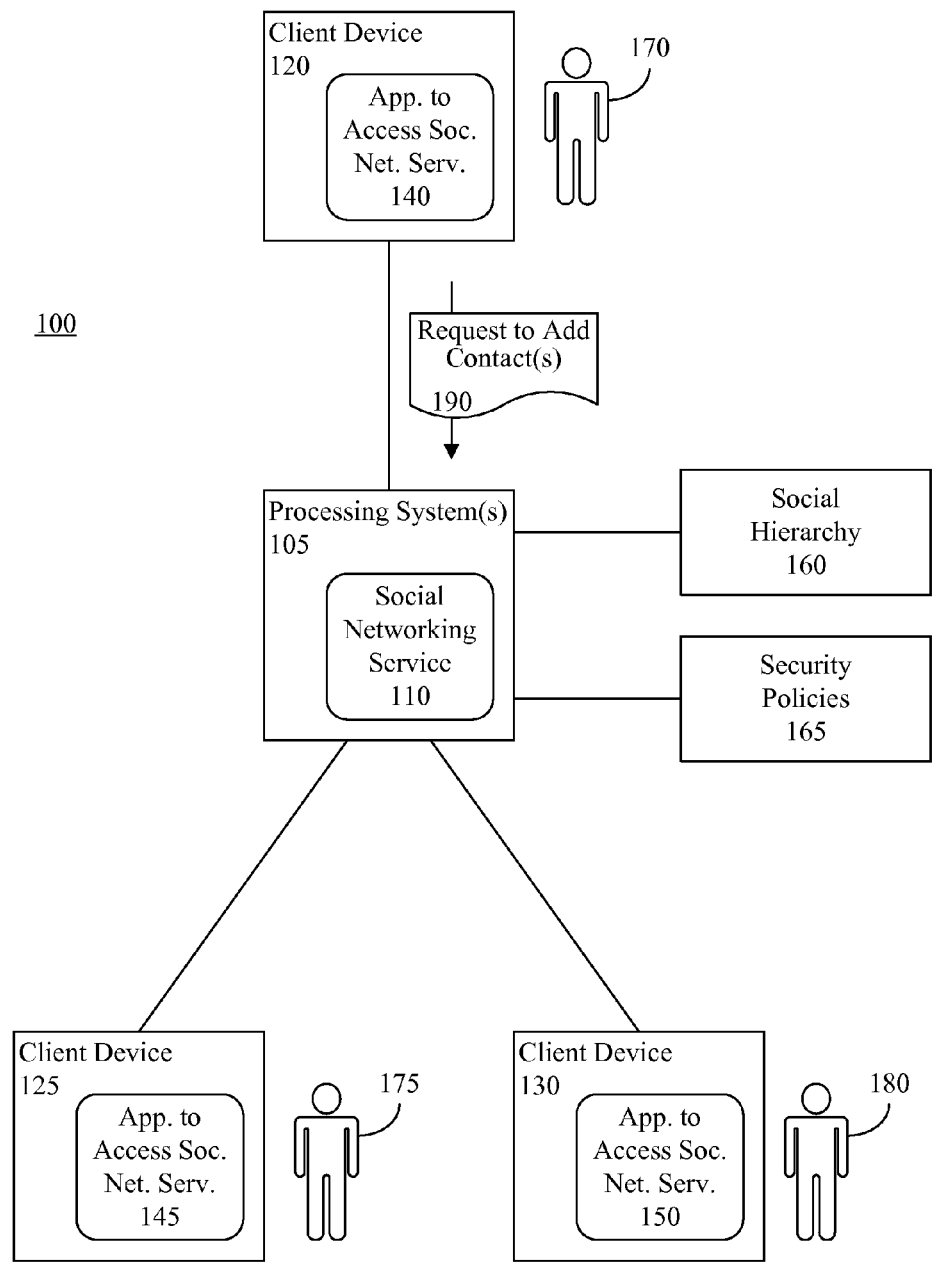
FIG. 1 is a block diagram illustrating a system for establishing social network connections in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to establishing social network connections. More particularly, certain users are provided the ability to add other users as their contacts in the social network without requiring the other users to approve a request to do so. For example, in a business environment, a manager can request that members of the manager's team be added as contacts of the manager. Similarly, a member of the manager's team can add the manager as a contact of the member. In some instances, a member of a team can add other members of the team as contacts. Accordingly, the present arrangements can simplify the process of adding user contacts in a social network. The determination of whether a particular user can add another user as a contact without requiring the other user to approve the contact request can be based on a hierarchical relationship between the users in an a social hierarchy, for example an organizational structure, and/or one or more security policies.

As used herein, the term "social network" means a social structure provided by a computing network based social networking service, the social structure comprising a set of users, wherein a tie between a first user and a second user is created when the first user adds the second user as a contact of the first user in the social networking service. As used herein, a social network is different than an online community service, such as a forum, in which a user communicates with other members of the online community service without being specifically required to add such other members as contacts of the user in order for the user to communicate with the other members. For example, in a forum, a user need only register with the forum to be able to post messages, pictures, etc. that are shared with other members of the forum. In contrast, in a social network, when a user posts messages, pictures, etc., such information is only shared with the user's contacts, at least initially. Sometimes the contacts are able to share the information with others, depending on the user's security settings.

FIG. 1 is a block diagram illustrating a system 100 for establishing social network connections in accordance with one embodiment disclosed within this specification. The system 100 can include one or more server(s) 105 that host a social networking service 110 that provides a social network. As used herein, the term "server" means a processing system, comprising at least one processor and memory, configured to execute computer program code (e.g., one or more applications, services, etc.).

The system 100 also can include a plurality of client devices 120, 125, 130. Examples of client devices include, but are not limited to, computers (e.g., desktop computers, workstations, mobile computers, laptop computers, tablet computers, netbook computers, etc.), smart phones, personal digital assistants, and so on. In this regard, each client device 120-130 can include one or more processors and memory, and can be configured to execute computer program code. In illustration, the client devices 120-130 each can include a respective application 140, 145, 150 via which the client devices 120-130 access the social networking service 110. In one arrangement, the applications 140-150 can be, for example, web browsers. In another arrangement, the applications 140-150 can be applications specifically configured to communicate with the social networking service 110.

The client devices 120-130, and thus the applications 140-150, can be communicatively linked to the server(s) 105, and thus the social networking service 110, via one or more communication networks. The communication networks can be implemented as, or include, any of a variety of different networks such as a WAN, a LAN, a wireless network, a mobile network, a Virtual Private Network (VPN), the Internet, the Public Switched Telephone Network (PSTN), or the like.

The social networking service 110 can be configured to access a social hierarchy 160 and/or one or more security policies 165. For example, the social networking service 110 can access the social hierarchy 160 and/or security policies 165 via the communication network(s), or the social hierarchy 160 and/or security policies 165 can be stored on a data storage device connected to the server 105 in another suitable manner. The social hierarchy 160 can be, for example, an organizational chart that indicates relationships among people, such as the users 170-180, in an organization. The security policies 165 can indicate which users or classes of users are allowed to add other users or classes of users as contacts in the social network without requiring the other users to approve corresponding contact requests. In this regard, the security policies 165 can set forth security polices for users or user classes defined in the social hierarchy 160.

Via the client devices 120-130, the respective users 170, 175, 180 can use the social networking service 110 to share ideas, pictures, posts, activities, events, interests, etc. with other users identified as their respective contacts in the social network. For example, a user 180 can enter text to be shared with the user's contacts into the social networking service 110, upload pictures or diagrams to be shared with the user's contacts, and so on.

In accordance with the arrangements described herein, if the user 170 chooses to add the user 175 as a contact of the user 170 in the social network, via the application 140, the user 170 can send a corresponding request 190 to the social networking service 110. In response to the request 190, the social networking service 110 can access the social hierarchy 160 and/or security policies 165 to determine whether the user 170 is authorized to add the user 175 as a contact of the user 170 in the social network without requiring the user 175 to approve the request 190. If so, the user 175 can be added as a contact of the user 170 in the social network without prompting the user 175 to approve the request. Since the user 175 is not prompted to approve the request 190, the user 175 cannot deny the request. Moreover, if the security policies 165 so dictate, the user 175 can be prevented from removing himself/herself as a contact of the user 170.

The user 170 also can add groups of users as contacts of the user 170 in the social network in a similar manner. For example, if the user's 175, 180 are members of a group (e.g., a team), the group can be indicated in the social hierarchy 160. The user 170 can access a listing of groups contained in the social hierarchy 160 via the social networking service 110, select the group, and generate the request 190 to add all users 175, 180 in the group as contacts of the user 170. In response to the request 190, the social networking service 110 can access a social hierarchy 160 and/or security policies 165 to determine whether the user 170 is authorized to add the users 175, 180 as contacts of the user 170 in the social network without requiring the users 175, 180 to approve the request 190. If so, the users 175, 180 can be added as contacts of the user 170 in the social network without prompting the users 175, 180 to approve the request. Since the users 175, 180 are not prompted to approve the request 190, the users 175, 180 cannot deny the request. Moreover, if the security policies 165 so dictate, the users 175, 180 can be prevented from removing themselves as contacts of the user 170.

In one arrangement, the social networking service 110 can provide the user 170 one or more user selectable options relating to whether information posted by the user 170 is shared with the users 175, 180 and/or whether information posted by the users 175, 180 is shared with the user 170. For example, the user 170 may desire to use the social network to share information with the users 175, 180, but may not wish to receive information posted by the users 175, 180. Thus, when establishing the users 175, 180 as contacts, or sometime thereafter, the user 170 can select an option to publish posts by the user 170 in the social network so that such posts are presented to the users 175, 180 when they are perusing posts in the social network, but publish posts by the users 175, 180 in a manner in which such posts are not presented to the user 170 when the user 170 is perusing posts in the social network.

In another example, the user 170 may desire not to share information with the users 175, 180 via the social network, but may wish to receive information posted by the users 175, 180. Thus, when establishing the users 175, 180 as contacts, or sometime thereafter, the user 170 can select an option to publish posts by the user 170 in the social network in a manner so that such posts are presented to the users 175, 180 when they are perusing posts in the social network, but publish posts by the users 175, 180 in a manner in which such posts are presented to the user 170 when the user 170 is perusing posts in the social network.

In one aspect of the present arrangements, the social networking service 110 can access the social hierarchy 160, and automatically create connections between peers in the social hierarchy 160. In one non-limiting arrangement, the user 170 need not generate a request 190 to create the connections in the social network. Instead, the request can be generated by the social network service 110 in response to the social networking service 110 identifying a particular parameter, such as a parameter indicating a user being added to the social network, changing teams, being promoted, etc.

For example, in a business environment, all members of a team can be indicated as being peers in the social hierarchy 160. For each member of the team, the social networking service 110 can automatically add as a contact of the team member each other member of the team. When a user is added as a new member of a team, all other members of the team can be added as contacts of the user, and the user can be added as a contact for each of the other members. Optionally, when a user is removed from a team, that user can be automatically removed from being a contact of the other team members, and the other team members can be automatically removed from being contacts of the user. Accordingly, the social networking service 110 can automatically create connections among users who have similar job roles, responsibilities and expertise to facilitate collaboration among the users.

In another aspect of the present arrangements, the social networking service 110 can access the social hierarchy 160, and automatically create connections between the user 170 and other users in the in the social hierarchy 160 who are ranked above the user 170. As noted, the social networking service 110 can access the security policies 165 to determine whether the other users must approve such connections, and automatically create the connections if this is not the case. For example, if the user 170 volunteers for a fundraising activity or political action committee, when the user 170 signs up as a volunteer, the social networking service 110 can generate a request to automatically add users 175, 180, who in this example are above the user 170 in the social hierarchy. In response, the social networking service 110 can add the users 175, 180 as contacts of the user without prompting the users 175, 180 to approve such connections. In one non-limiting arrangement, the user 170 need not generate a request 190 to create such connections in the social network. When the user 170 is no longer associated with the particular group, or a particular activity is completed, the social networking service 110 can automatically, or at the request of the user 170, remove the users 175, 180 as contacts of the user 170 to remove the connections between the user 170 and the users 175, 180. This can be implemented using, for example, a rollback function that removes the users 175, 180 as contacts.

The present arrangements also can be implemented to create connections between users in different organizations, for example when different organizations need to cooperate with each other on a particular project, in response to an emergency or natural disaster, etc. Examples of such organizations include, but are not limited to, organizations coordinating efforts (e.g., the Federal Emergency Management Agency (FEMA)), the National Guard, emergency responders, political structures, etc. Each organization can have its own social hierarchy similar to the social hierarchy 160 and/or security policies.

When the project is initiated, or the emergency or natural disaster occurs, the social networking service 110 can access the respective social hierarchies and/or security policies and automatically create connections between users in different organizations. As noted, the social networking service 110 can access applicable security policies to determine whether the users must approve such connections, and automatically create the connections if this is not the case. The connections can be based on roles assigned to users 170-180, levels of users 170-180 in their respective social hierarchies, and so on. For example, user's 170-180 responsible for deploying personnel, coordinating overtime, coordinating aid disbursement, etc., can be automatically connected as described herein by adding users 170-180 as contacts of other users 170-180. In illustration, a leader in the National Guard can be automatically connected to a local police chief and a local fire chief. Creation of the connections can be initiated by an administrator in at least one of the organizations or an administrator in the social networking service 110, or be initiated automatically upon the social networking service 110 otherwise becoming aware that the project is initiated, or the emergency or natural disaster occurs. Accordingly, the present arrangements can facilitate proper deployment/redeployment of resources in an impacted area (or on an impacted project) without the workflow requiring calls to be placed and identifying proper resources, which can save both time and money.

The connections that are established can be automatically terminated and the end of the project, emergency, natural disaster, etc., or be maintained at least for a particular period. For example, connections for front line emergency responders can be removed when operations cease, while connections for management personnel can persist for a pre-determined period, or indefinitely, to allow the management personnel to coordinate on follow-up activities.

In the arrangements and examples described herein, optionally, by default a limited access profile can be created and/or used for each user 175, 180 added as a contact of the user 170, and these limited access profiles can be shared with the user 170. A limited access profile also can be created and/or used for the user 170 and shared with the users 175, 180. For example, the limited access profile for each user 170-180 may, in certain circumstances, only contain information related to the user's participation in the team, organization or the like, or related to activities common among the users 170-180. Nonetheless, the social networking service 110 can provide an option to each user 170-180 to share another (e.g., non-limited) profile with one or more of the user's contacts. For example, the user 170 can share a limited access profile with user's ranked higher and/or lower than the user 170 in the social hierarchy 160, but share a non-limited profile with selected other users and/or peers in the social hierarchy 160. Optionally, the users 170-185 can customize their limited access profiles. Moreover, numerous other options for use of limited access and custom profiles are within the scope of the present embodiments.

Figure 2:
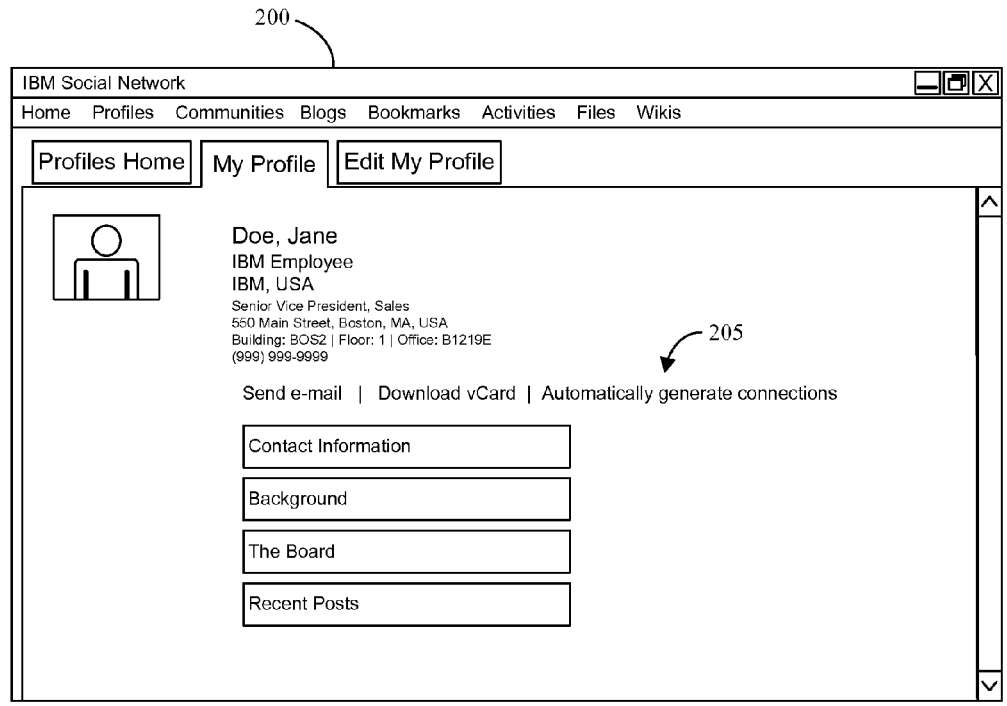
FIG. 2 depicts a view presented by a user interface of a social networking service in accordance with one embodiment disclosed within this specification.

FIG. 2 depicts a view 200 presented by a user interface of the social networking service 110 in accordance with one embodiment disclosed within this specification. Referring both to FIG. 1 and FIG. 2, the view 200 can be presented on the client device 120 to the user 170 via the application 140. For example, the view 200 can be communicated from the social networking service 110 to the application 140 using a suitable markup language communicated using the TCP/IP communication protocol, or communicated in any other suitable manner. When the user 170 desires to automatically generate one or more social network connections, the user 170 can select a user selectable item 205 (e.g., selectable text, icon, image, button, radio button, or the like) in the view 200 to initiate the process of making the connection(s). In response, the social networking service 110 can present to the user 170 a view 300 depicted in FIG. 3.

Figure 3:
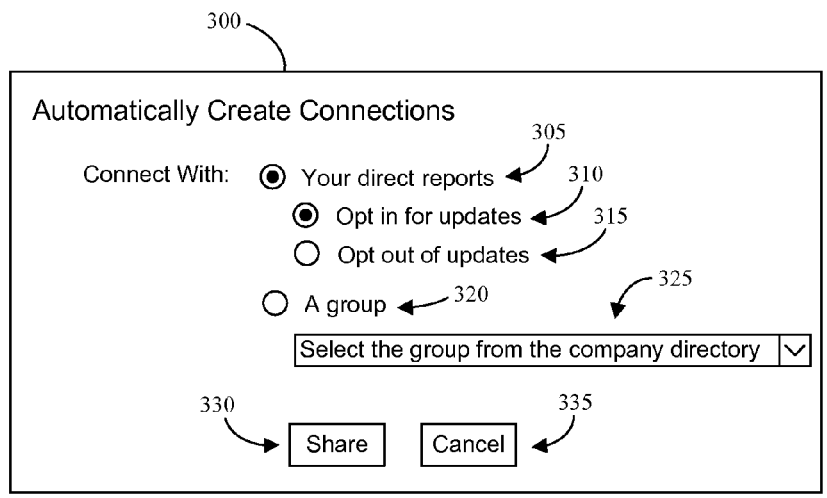
FIG. 3 depicts another view presented by a user interface of a social networking service in accordance with one embodiment disclosed within this specification.

Referring both to FIG. 1 and FIG. 3, the view 300 can present to the user 170 a variety of options for adding one or more users as contacts of the user 170 in the social network. For example, the view 300 can present a user selectable item 305 allowing the user 170 to add users 175, 180 who are her direct reports as contacts. The view 300 also can present user selectable items 310, 315 allowing the user 170 to opt in for updates posted by the users 175, 180 in the social network, or opt out of updates posted by the users 175, 180 in the social network. The view further can present a user selectable item 320 to allow the user to select a group of users to add as contacts of the user in the social network. A user selectable item 325 also can be presented to allow the user to select a specific group of users in the case the user selects the item 320. For example a selection box, drop down menu, or a link to another menu can be provided. When the user has made the desired selections, the user can select a user selectable item 330 (e.g., "share") to initiate the process of adding the selected users as contacts. In illustration, when the item 330 is selected, the request 190 to add the selected users as contacts can be generated and communicated from the application 140 to the social networking service 110. If the user chooses to not initiate the process of establishing the connections, the user 170 can select a user selectable item 335 (e.g., "cancel") to close the view 300 and return to the view 200 presented in FIG. 2.

FIG. 4 is a flow chart illustrating a method 400 of establishing social network connections in accordance with one embodiment disclosed within this specification. At step 405, a request to add at least a second user of a social network as a contact of a first user in the social network. As noted, the request can be generated and sent to a social networking service at the behest of the first user, or the request can be automatically generated by the social network networking service itself, for example in response to the social networking service identifying one or more parameters or conditions that trigger the request to be generated.

At step 410, at least one social hierarchy indicating a hierarchical relationship between the first user and the at least second user can be accessed. At step 415, based on the hierarchical relationship between the first user and the at least second user, via a processor, a determination can be made as to whether the at least second user must approve the request in order for the at least second user to be added as the contact of the first user in the social network. Such decision can be based on the social hierarchy and/or one or more security policies.

Referring to decision box 420, if it is determined that it is not required that the at least second user must approve the request in order for the at least second user to be added as the contact of the first user in the social network, at step 425 the at least second user can be added as a contact of the first user. Moreover, the at least second user can be prevented from denying the request. Otherwise, at step 430 the second user can be prompted to approve the request. If the second user approves the request, the second user can be added as a contact of the first user. If not, a message can be presented to the first user indicating that the second user has denied the request. In one arrangement, the message need only be presented to the first user if the first user generated the request, for instance if the request was not automatically generated by the social networking service.

Figure 5:
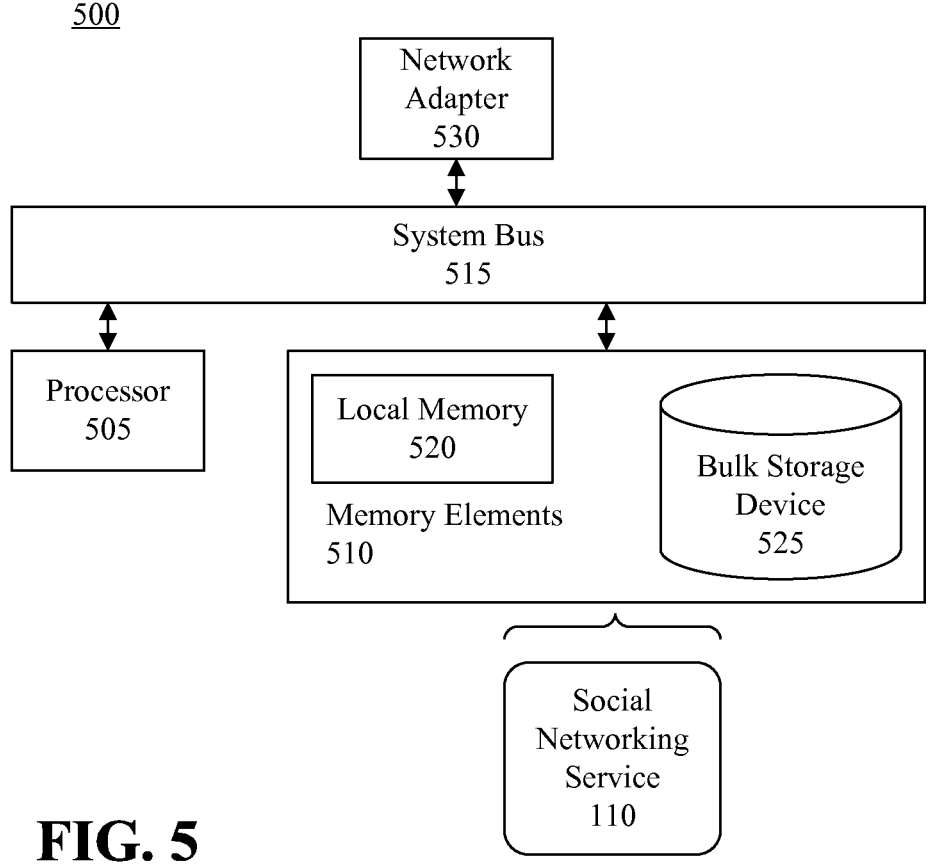
FIG. 5 is a block diagram illustrating a processing system for establishing social network connections in accordance with one embodiment disclosed within this specification.

FIG. 5 is a block diagram illustrating a processing system 500 for establishing social network connections in accordance with one embodiment disclosed within this specification. The processing system can be implemented in the system 100 of FIG. 1 as the server 105.

The processing system 500 can include at least one processor 505 (e.g., a central processing unit) coupled to memory elements 510 through a system bus 515 or other suitable circuitry. As such, the processing system 500 can store program code within the memory elements 510. The processor 505 can execute the program code accessed from the memory elements 510 via the system bus 515. It should be appreciated that the processing system 500 can be implemented in the form of any system including a processor and memory that is capable of performing the functions and/or operations described within this specification performed by the server 105/social networking service 110.

The memory elements 510 can include one or more physical memory devices such as, for example, local memory 520 and one or more bulk storage devices 525. Local memory 520 refers to RAM or other non-persistent memory device(s) generally used during actual execution of the program code. The bulk storage device(s) 525 can be implemented as a hard disk drive (HDD), solid state drive (SSD), or other persistent data storage device. The processing system 500 also can include one or more cache memories (not shown) that provide temporary storage of at least some program code in order to reduce the number of times program code must be retrieved from the bulk storage device 525 during execution.

One or more network adapters 530 also can be coupled to processing system 500 to enable processing system 500 to become coupled to other systems, computer systems, remote printers, and/or remote storage devices through intervening private or public networks. Modems, cable modems, transceivers, and Ethernet cards are examples of different types of network adapters 530 that can be used with processing system 500. Other input/output devices (not shown), such as a keyboard, display and pointing device, optionally can be coupled to the processing system 500.

As pictured in FIG. 5, the memory elements 510 can store the social networking service 110 of FIG. 1. Being implemented in the form of executable program code, the social networking service 110 can be executed by the processing system 500 and, as such, can be considered part of the processing system 500. Moreover, the social networking service 110 is a functional data structure that imparts functionality when employed as part of the processing system 500 of FIG. 5.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of establishing social network connections, the method comprising:
    receiving a request initiated by a first user in a social network to add at least a second user of the social network as a contact of the first user in the social network;
    accessing at least one social hierarchy indicating a hierarchical relationship between the first user and the at least second user;
    accessing a security policy for the at least second user;
    based on the hierarchical relationship between the first user and the at least second user, via a processor, determining whether the at least second user must approve the request in order for the at least second user to be added as the contact of the first user in the social network;
    based on the security policy for the at least second user, determining whether the first user is authorized to add the at least second user as the contact of the first user in the social network without the at least second user being prompted to approve the request;
    responsive to determining that it is not required that the at least second user must approve the request in order for the at least second user to be added as the contact of the first user in the social network, and responsive to determining that the first user is authorized to add the at least second user as the contact of the first user in the social network without prompting the at least second user to approve the request, adding the at least second user as the contact of the first user in the social network without prompting the at least second user to approve the request; and
    responsive to adding the at least second user as the contact of the first user, based on the security policy for the at least second user or a security policy for the first user, preventing the at least second user from removing the at least second user as the contact of the first user.

2. The method of claim 1, wherein adding the at least second user as the contact of the first user in the social network without prompting the at least second user to approve the request comprises preventing the at least second user from denying adding the at least second user as the contact of the first user in the social network.

3. The method of claim 1, further comprising:
    accessing a security policy for the first user;
    wherein determining whether the first user is authorized to add the at least second user as the contact of the first user in the social network without the at least second user being prompted to approve the request further is based on the security policy for the first user.

4. The method of claim 1, further comprising:
    configuring a user profile of the first user to send to the at least second user posts published in the social network by the first user that is not user profile data; and
    configuring the user profile of the first user to block from being presented to the first user posts published in the social network by the at least second user that is not user profile data.

5. The method of claim 1, further comprising:
    configuring a user profile of the first user to send to the at least second user posts published in the social network by the first user that is not user profile data;
    prompting the first user to choose whether to be presented posts published in the social network by the at least second user that is not user profile data; and
    responsive to the first user choosing to not be presented the posts published in the social network by the at least second user that is not user profile data, configuring the user profile of the first user to block from being presented to the first user posts posted in the social network by the at least second user that is not user profile data.

6. The method of claim 1, further comprising:
    responsive to adding the at least second user as the contact of the first user, sharing with the first user a limited access profile of the second user, wherein the limited access profile contains only information related to the second user's participation in a team or the second user's participation in an organization.

7. A system comprising:
    a hardware processor programmed to initiate executable operations comprising:
    receiving a request initiated by a first user in a social network to add at least a second user of the social network as a contact of the first user in the social network;
    accessing at least one social hierarchy indicating a hierarchical relationship between the first user and the at least second user;
    accessing a security policy for the at least second user;
    based on the hierarchical relationship between the first user and the at least second user, determining whether the at least second user must approve the request in order for the at least second user to be added as the contact of the first user in the social network;

based on the security policy for the at least second user, determining whether the first user is authorized to add the at least second user as the contact of the first user in the social network without the at least second user being prompted to approve the request;

responsive to determining that it is not required that the at least second user must approve the request in order for the at least second user to be added as the contact of the first user in the social network, and responsive to determining that the first user is authorized to add the at least second user as the contact of the first user in the social network without prompting the at least second user to approve the request, adding the at least second user as the contact of the first user in the social network without prompting the at least second user to approve the request; and responsive to adding the at least second user as the contact of the first user, based on the security policy for the at least second user or a security policy for the first user, preventing the at least second user from removing the at least second user as the contact of the first user.

8. The system of claim 7, wherein adding the at least second user as the contact of the first user in the social network without prompting the at least second user to approve the request comprises preventing the at least second user from denying adding the at least second user as the contact of the first user in the social network.

9. The system of claim 7, the executable operations further comprising:
accessing a security policy for the first user;
wherein determining whether the first user is authorized to add the at least second user as the contact of the first user in the social network without the at least second user being prompted to approve the request further is based on the security policy for the first user.

10. The system of claim 7, the executable operations further comprising:
configuring a user profile of the first user to send to the at least second user posts published in the social network by the first user that is not user profile data; and
configuring the user profile of the first user to block from being presented to the first user posts published in the social network by the at least second user that is not user profile data.

11. The system of claim 7, the executable operations further comprising:
configuring a user profile of the first user to send to the at least second user posts published in the social network by the first user that is not user profile data;
prompting the first user to choose whether to be presented posts published in the social network by the at least second user that is not user profile data; and
responsive to the first user choosing to not be presented the posts published in the social network by the at least second user that is not user profile data, configuring the user profile of the first user to block from being presented to the first user posts posted in the social network by the at least second user that is not user profile data.

12. The system of claim 7, the executable operations further comprising:
responsive to adding the at least second user as the contact of the first user, sharing with the first user a limited access profile of the second user, wherein the limited access profile contains only information related to the second user's participation in a team or the second user's participation in an organization.

13. A computer program product for establishing social network connections, the computer program product comprising a computer readable storage device, wherein the computer readable storage device is not a transitory, propagating signal per se, having program code stored thereon, the program code executable by a processor to perform a method comprising:
receiving, by the processor, a request initiated by a first user in a social network to add at least a second user of the social network as a contact of the first user in the social network;
accessing, by the processor, at least one social hierarchy indicating a hierarchical relationship between the first user and the at least second user;
accessing a security policy for the at least second user;
based on the hierarchical relationship between the first user and the at least second user, via a processor, determining, by the processor, whether the at least second user must approve the request in order for the at least second user to be added as the contact of the first user in the social network;
based on the security policy for the at least second user, determining, by the processor, whether the first user is authorized to add the at least second user as the contact of the first user in the social network without the at least second user being prompted to approve the request;
responsive to determining that it is not required that the at least second user must approve the request in order for the at least second user to be added as the contact of the first user in the social network, and responsive to determining that the first user is authorized to add the at least second user as the contact of the first user in the social network without prompting the at least second user to approve the request, adding, by the processor, the at least second user as the contact of the first user in the social network without prompting the at least second user to approve the request; and
responsive to adding the at least second user as the contact of the first user, based on the security policy for the at least second user or a security policy for the first user, preventing, by the processor, the at least second user from removing the at least second user as the contact of the first user.

14. The computer program product of claim 13, the method further comprising:
accessing, by the processor, a security policy for the at least second user;
wherein determining, by the processor, whether the first user is authorized to add the at least second user as the contact of the first user in the social network without the at least second user being prompted to approve the request.

15. The computer program product of claim 13, the method further comprising:
configuring, by the processor, a user profile of the first user to send to the at least second user posts published in the social network by the first user that is not user profile data; and
configuring the user profile of the first user to block from being presented to the first user posts published in the social network by the at least second user that is not user profile data.

16. The computer program product of claim 13, the method further comprising:

configuring, by the processor, a user profile of the first user to send to the at least second user posts published in the social network by the first user that is not user profile data;

prompting, by the processor, the first user to choose whether to be presented posts published in the social network by the at least second user that is not user profile data; and responsive to the first user choosing to not be presented the posts published in the social network by the at least second user that is not user profile data, configuring, by the processor, the user profile of the first user to block from being presented to the first user posts posted in the social network by the at least second user that is not user profile data.

17. The computer program product of claim 13, the method further comprising:

responsive to adding the at least second user as the contact of the first user, sharing, by the processor, with the first user a limited access profile of the second user, wherein the limited access profile contains only information related to the second user's participation in a team or the second user's participation in an organization.

* * * * *